(12) United States Patent
Monro

(10) Patent No.: US 7,783,079 B2
(45) Date of Patent: Aug. 24, 2010

(54) MOTION ASSISTED DATA ENHANCEMENT

(76) Inventor: Donald M. Monro, 6, The Lays, Goose Street, Beckington, Somerset (GB) BA11 6RS ( * ) Notice: Subject to any disclaimer, the term of this patent is extended or adjusted under 35 U.S.C. 154(b) by 1040 days.

(21) Appl. No.: 11/399,753

(22) Filed: Apr. 7, 2006

(65) Prior Publication Data

US 2007/0258654 A1 Nov. 8, 2007

(51) Int. Cl.
G06K 9/00 (2006.01)
G06K 9/40 (2006.01)
H04N 5/14 (2006.01)
G03B 13/00 (2006.01)

(52) U.S. Cl. .................. 382/107; 382/254; 348/25; 348/352

(58) Field of Classification Search ............... 382/103, 382/107, 236, 254, 263, 266; 348/14.1, 25, 348/97, 137, 140, 154, 155, 169–172, 208.1, 348/208.2, 208.13, 208.14, 208.16, 287, 348/329, 352, 407.1, 331
See application file for complete search history.

(56) References Cited

U.S. PATENT DOCUMENTS

| 4,168,513 | A | 9/1979 | Hains et al. |
| 4,509,038 | A | 4/1985 | Hirano |
| 4,675,809 | A | 6/1987 | Koichiro |
| 4,908,873 | A | 3/1990 | Philibert et al. |
| 5,218,435 | A | 6/1993 | Lim et al. |
| 5,315,670 | A | 5/1994 | Shapiro |
| 5,321,776 | A | 6/1994 | Shapiro |
| 5,412,741 | A | 5/1995 | Shapiro |
| 5,559,931 | A | 9/1996 | Shindou et al. |
| 5,699,121 | A | 12/1997 | Zakhor et al. |
| 5,748,786 | A | 5/1998 | Zandi et al. |
| 5,754,704 | A | 5/1998 | Barnsley et al. |
| 5,768,437 | A | 6/1998 | Monro et al. |
| 5,819,017 | A | 10/1998 | Akeley et al. |
| 5,873,076 | A | 2/1999 | Barr et al. |
| 5,956,429 | A | 9/1999 | Burns |
| 6,029,167 | A | 2/2000 | Evans |
| 6,052,416 | A | 4/2000 | Koga |
| 6,078,619 | A | 6/2000 | Monro et al. |
| 6,086,706 | A | 7/2000 | Brassil et al. |
| 6,125,348 | A | 9/2000 | Levine |

(Continued)

FOREIGN PATENT DOCUMENTS

EP 0 595 599 A2 5/1994

(Continued)

OTHER PUBLICATIONS

Choog Soo Park et al., "Lost Motion Vector Recovery Algorithm," Circuits and Systems, IEEE International Symposium on London, vol. 3, 1994, pp. 229-232.

(Continued)

*Primary Examiner*—Abolfazl Tabatabai
(74) *Attorney, Agent, or Firm*—Sterne Kessler Goldstein & Fox PLLC

(57) ABSTRACT

A method of enhancing data. A trace may be determined from a target data point in a target frame and a respective data point in an adjacent frame. At least an approximate value of the target data point may be determined from the trace.

24 Claims, 4 Drawing Sheets

U.S. PATENT DOCUMENTS

| | | | |
|---|---|---|---|
| 6,144,835 | A | 11/2000 | Inoue |
| 6,208,744 | B1 | 3/2001 | Ishige et al. |
| 6,336,050 | B1 | 1/2002 | Amin et al. |
| 6,434,542 | B1 | 8/2002 | Farmen et al. |
| 6,480,547 | B1 | 11/2002 | Chen et al. |
| 6,522,785 | B1 * | 2/2003 | Kondo et al. ............... 382/254 |
| 6,556,719 | B1 | 4/2003 | Monro |
| 6,625,213 | B2 | 9/2003 | Bottreau et al. |
| 6,654,503 | B1 | 11/2003 | Sudharsanan et al. |
| 6,810,144 | B2 * | 10/2004 | McGee et al. ............... 382/166 |
| 6,820,079 | B1 | 11/2004 | Evans |
| 6,847,966 | B1 | 1/2005 | Sommer et al. |
| 6,983,420 | B1 * | 1/2006 | Itou et al. ................... 715/723 |
| 6,990,145 | B2 * | 1/2006 | Monro et al. .......... 375/240.12 |
| 7,003,039 | B2 * | 2/2006 | Zakhor et al. .......... 375/240.22 |
| 7,079,986 | B2 | 7/2006 | Sieracki |
| 7,230,551 | B2 | 6/2007 | Moriya et al. |
| 7,515,768 | B2 * | 4/2009 | Nishi et al. ................. 382/275 |
| 2002/0069206 | A1 | 6/2002 | Bergman et al. |
| 2002/0071594 | A1 * | 6/2002 | Kool et al. ................. 382/103 |
| 2003/0108101 | A1 | 6/2003 | Frossard et al. |
| 2004/0028135 | A1 | 2/2004 | Monro |
| 2004/0126018 | A1 | 7/2004 | Monro |
| 2004/0165737 | A1 | 8/2004 | Monro |
| 2004/0218836 | A1 | 11/2004 | Kanatsu |
| 2005/0149296 | A1 | 7/2005 | Sieracki |
| 2005/0152453 | A1 | 7/2005 | Lee et al. |
| 2006/0023790 | A1 | 2/2006 | Tsai et al. |
| 2007/0016414 | A1 | 1/2007 | Mehrotra et al. |
| 2007/0030177 | A1 | 2/2007 | Monro |
| 2007/0053434 | A1 | 3/2007 | Monro |
| 2007/0053597 | A1 | 3/2007 | Monro |
| 2007/0053603 | A1 | 3/2007 | Monro |
| 2007/0164882 | A1 | 7/2007 | Monro |
| 2007/0252733 | A1 | 11/2007 | Thebault et al. |
| 2007/0271250 | A1 | 11/2007 | Monro |
| 2007/0282933 | A1 | 12/2007 | Monro |
| 2007/0290898 | A1 | 12/2007 | Monro |
| 2007/0290899 | A1 | 12/2007 | Monro |
| 2008/0005648 | A1 | 1/2008 | Monro |
| 2008/0055120 | A1 | 3/2008 | Monro |
| 2008/0056346 | A1 | 3/2008 | Monro |
| 2008/0084924 | A1 | 4/2008 | Monro |
| 2008/0086519 | A1 | 4/2008 | Monro |

FOREIGN PATENT DOCUMENTS

| | | |
|---|---|---|
| EP | 0 836 325 A1 | 4/1998 |
| EP | 1 545 010 A1 | 6/2005 |
| EP | 1 610 560 A | 12/2005 |
| GB | 2 293 733 A | 4/1996 |
| GB | 2 409 943 A | 7/2005 |
| WO | WO97/16029 | 5/1997 |
| WO | WO98/11730 | 3/1998 |
| WO | WO99/08449 | 2/1999 |
| WO | WO01/15456 | 3/2001 |
| WO | WO 01/46756 | 6/2001 |
| WO | WO01/63935 | 8/2001 |
| WO | WO02/13538 | 2/2002 |
| WO | WO2004/051863 | 6/2004 |
| WO | WO2005/027049 | 3/2005 |
| WO | WO 2005/064799 | 7/2005 |
| WO | WO 2005/067661 | 7/2005 |
| WO | WO2005/119581 | 12/2005 |
| WO | WO2007/030702 | 3/2007 |
| WO | WO2007/030784 | 3/2007 |
| WO | WO2007/030785 | 3/2007 |
| WO | WO2007/030788 | 3/2007 |
| WO | WO 2007/084336 | 7/2007 |
| WO | WO 2007/118220 | 10/2007 |
| WO | WO 2007/145875 | 12/2007 |
| WO | WO 2007/149358 | 12/2007 |
| WO | WO 2007/149383 | 12/2007 |
| WO | WO 2007/149384 | 12/2007 |
| WO | WO 2008/027450 | 3/2008 |
| WO | WO 2008/030426 | 3/2008 |
| WO | WO/2008/045280 | 4/2008 |
| WO | WO/2008/045281 | 4/2008 |

OTHER PUBLICATIONS

Final Office Action for U.S. Appl. No. 11/332,777, mailed Aug. 13, 2008, 5 pgs.

Final Office Action for U.S. Appl. No. 11/255,090, mailed Sep. 3, 2008, 11 pgs.

Non-Final Office Action for U.S. Appl. No. 11/425,142, mailed Sep. 16, 2008, 12 pgs.

International Search Report for Appln. No. PCT/US2008/002179, issued Aug. 20, 2008, 12 pgs.

Non-Final Office Action for U.S. Appl. No. 11/255,090, dated Dec. 15, 2008, 11 pgs.

International Search Report and Written Opinion for Appln. No. PCT/US2008/002101, dated Dec. 12, 2008, 13 pgs.

Cotter et al., "Application of Tree-Based Searches to Matching Pursuit," 2001 IEEE International Conference on Acoustics, Speech and Signal Processing, New York, NY, vol. 6, 7, May 2001, pp. 3933-3936.

Shoa et al., "Tree Structure Search for Matching Pursuit," Image Processing, 2005, vol. 3, 11, pp. 908-911.

Qiangsheng Liu et al., "A low-cost video encoder with matching pursuit," Intelligent Multimedia, Video and Speech Processing, May 2, 2001, pp. 502-505.

Yuan Yuan et al., "Improved Matching Pursuits Image Coding," Acoustics, Speech, and Signal Processing, 2005, vol. 2, 18, pp. 201-204.

International Search Report and Written Opinion for Appln. No. PCT/US2008/002100, dated Dec. 12, 2008, 14 pgs.

International Search Report for Appln. No. PCT/US2007/021302, dated Dec. 10, 2008, 5 pgs.

Haoxing Zhang et al., "A Hybrid Video Coder Based on H.264 with Matching Pursuits," Acoustics, Speech and Signal Processing, 2006, p. 889.

Yuan et al., "3D Wavelet Video Coding with Replicated Matching Pursuits," Sep. 11, 2005, Image Processing, pp. 69-72.

Monro et al., "Subband Adaptive Dictionaries for Wavelet/Matching Pursuits Image Coding," Oct. 8, 2006, Image Processing, p. 2136.

Chien-Kai et al., "Matching Pursuits Low Bit Rate Video Coding with Codebooks Adaptation," Jun. 5, 2000, Acoustics, Speech, and Signal Processing, pp. 408-411.

International Search Report for Appln. No. PCT/US2007/021303, dated Dec. 12, 2008, 5 pgs.

Rabiee et al., "Scalable Subband Image Coding with Segmented Orthogonal Matching Pursuit," Oct. 4, 1998, Image Processing, pp. 774-777.

Rabiee et al., "Low-bit-rate Subband Image Coding with Matching Pursuits," Visual Communications and Image Processing, vol. 3309, 1998, pp. 875-880.

Schmid-Saugeon et al., "Dictionary Design for Matching Pursuit and Application to Motion-Compensated Video Coding," 2004, IEEE Transactions on Circuits and Systems for Video Technology, pp. 880-886.

International Search Report for Appln. No. PCT/US2007/019297, dated Dec. 12, 2008, 5 pgs.

Non-Final Office Action for U.S. Appl. No. 11/422,316, mailed Dec. 4, 2008, 13 pgs.

Non-Final Office Action for U.S. Appl. No. 11/255,090, mailed Dec. 15, 2008, 15 pgs.

Non-Final Office Action for U.S. Appl. No. 11/332,777, mailed Feb. 25, 2009, 6 pgs.

Final Office Action for U.S. Appl. No. 11/425,142, mailed Mar. 2, 2009, 18 pgs.

International Search Report for Appln. No. PCT/US2007/014181 issued Jan. 23, 2008, 1 pg.

David Salomon, "Data Compression: The Complete Reference," 1998, Springer, XP002464409, pp. 32-33.
Non-Final Office Action for U.S. Appl. No. 11/677,511, mailed Feb. 20, 2009, 23 pgs.
Non-Final Office Action for U.S. Appl. No. 11/677,515, mailed Feb. 25, 2009, 21 pgs.
Brin et al., Copy detection mechanisms for digital documents, Proceedings of the 1995 ACM SIGMOD international conference on Management of data SIGMOD '95, vol. 24 ACM Press, May 1995, pp. 398-409.
Cancedda et al., Word Sequence Kernels, Mar. 2003, MIT Press, Journal of Machine Learning Research, vol. 3 Special Edition, pp. 1059-1082.
Cover et al. "Elements of Information Theory" Copyright Jon Wiley & Sons, Inc., p. 96, 1991.
Czerepinski et al., "Matching Pursuits Video Coding: Dictionaries and Fast Implementation" IEEE Trans Circuit Systems Video Technology, vol. 10, No. 7, pp. 1103-1115, Oct. 2000.
Daubechies, "Orthonormal Bases of Compactly Supported Wavelets" Comm. Pure Appl. Math., vol. 41 pp. 909-996, 1998.
De Natale, et al., "A Mesh-Interpolation Scheme for Very-Low Bitrate Coding of Video Sequences" European Transactions on Telecommunications, vol. 9, No. 1, pp. 47-55, 1998.
De Vleeschouwer et al., "Subband dictionaries for low-cost matching pursuits of video residues," IEEE Transactions on Circuits and Systems for Video Technology, vol. 9, Issue 7, pp. 984-993, Oct. 1999.
Figueras et al., "Color Image Scalable Coding with Matching Pursuit" IEEE Int. Conference Acoustics Speech Signal Process, pp. III-53-III-56, May 2004.
Frossard et al., "High Flexibility Scalable Image Coding" Proceedings of VCIP 2003, Jul. 2003.
Gamito et al. "Lossles Coding of Floating Point Data with JPEG 2000 Part 10" Proceedings of the SPIE, SPIE, Bellingham, VA, US. vol. 5558, Aug. 2, 2004. pp. 276-287.
Golomb, S.W., "Run-length encodings" IEEE Trans Info Theory, Jul. 1966, 12(3):399-401.
Horst et al. "Mupcos: A multi-purpose coding scheme" Signal Processing: Image Communication 5, pp. 75-89, 1993.
Hosang, M., "A Character Elimination Algorithm for Lossless Data Compression" Data Compression Conference, Proceedings. DCC, IEEE Computer Society Press, Los Alamitos, CA, US, Apr. 2, 2002, pp. 1-10.
Huffman, David A., "A Method for the Construction of Minimum-Redundancy Codes," Pro. Inst. Radio Eng., 1952, 9 (40), pp. 1098-1101.
Hull, Jonathan J., "Document Image Matching and Retrieval with Multiple Distortion-Invariant Descriptors", International Association for Pattern Recognition Workshop on Document Analysis Systems, Series in Machine Perception and Artificial Intelligence, vol. 14, published by World Scientific Publishing Co. Pte. Ltd. 1995, pp. 379-396.
Jun-peng Bao et al., "A new text feature extraction model and its application in document copy detection" Machine Learning and Cybernetics, 2003, International Conference on Nov. 2-5, 2003 Piscataway, NJ, USA, IEEE, vol. 1, Nov. 2, 2003, pp. 82-87.
Larsson, N.J., "The Context Trees of Block Sorting Compression" In Proceedings of the IEEE Data Compression Conference, Snowbird, Utah, Mar. 30-Apr. 1, pp. 189-198. IEEE Computer Society Press, 1998.
Mallat et al., "Matching Pursuits with Time-Frequency Dictionaries" IEEE Trans. Signal Processing, vol. 41. No. 12, pp. 3397-3415, Dec. 1993.
Mallat, "A Theory for Multiresolution Signal Decomposition: The Wavelet Representation" IEEE Trans. Pattern Anal. Mach. Intel., vol. 11, No. 7, Jul. 1989.
Monro et al., "Alignment Blur in Coherently Averaged Images" IEEE Transactions on Signal Processing, vol. 4, No. 6, pp. 1596-1601, Jun. 1996.
Monro et al., "Bases for Low Complexity Matching Pursuits Image Coding" Dept. of Electron. & Electr. Eng., Bath Univ., UK, 2005. IEEE International Conference on Image Processing, Publication Date: Sep. 11-14, 2005. vol. 2, pp. 249-252.
Monro et al., "Improved Coding of Atoms in Matching Pursuits" IEEE Int. Conference. Image Processing, vol. 2, Sep. 2003.
Monro et al., "Visual Embedding of Wavelet Transformation Coefficients" IEEE International Conference Image Process, pp. 186-189, Sep. 2000.
Monro, "Basis Picking for Matching Pursuits Image Coding" IEEE International Conference on Image Processing, pp. 2495-2498, Sep. 2004.
Moschetti et al., "New Dictionary and Fast Atom Searching Method for Matching Pursuit Representation of Displaced Frame Difference" IEEE International Conference on Image Processing, pp. II-685-II-688, Sep. 2002.
Neff et al., "Matching Pursuit Video Coding—Part I: Dictionary Approximation" IEEE Trans. Circuits System Video Technology, vol. 12, No. 1, pp. 13-26, Jan. 2002.
Neff et al., "Very Low Bit-Rate Video Coding Based on Matching Pursuits" IEEE Trans. Circuits and Systems for Video Tech., vol. 7, No. 1, pp. 158-171, Feb. 1997.
Poh et al., "Comparison of Residual Compression Methods in Motion Compensated Video" IEEE Int. Workshop on Multimedia Signal Processing, pp. 109-112, Dec. 2002.
R. F. Rice, "Some Practical Universal Noiseless Coding Techniques, " Jet Propulsion Laboratory, Pasadena, California, JPL Publication 79-22, Mar. 1979.
Ramchandran et al., "Best Wavelet Packet Bases in a Rate-Distortion Sense" IEEE Transactions on Signal Processing, vol. 2, No. 2, pp. 160-175, Apr. 1993.
Said et al., "A New, Fast, and Efficient Image Codec Based on Set Partitioning in Heirarchical Trees" IEEE Transactions on Circuits and Systems for Video Technology, vol. 6, No. 3, pp. 243-250, Jun. 1996.
Sayood, Khalid, "Introduction to Data Compression" Morgan Kaufmann Publishers Inc., San Francisco, CA, USA 1996, pp. 27-32.
Sayood, Khalid, "Introduction to Data Compression" Morgan Kaufmann Publishers Inc., San Francisco, CA, USA 1991, pp. 98-99.
Salomon, "Data Compression: the complete reference", Springer, pp. 32-33, 1998.
Schleimer et al., Data security protection: Winnowing: local algorithms for document fingerprinting, 2003 ACM SIGMOD international conference on Management of data (SIGMOD '03), ACM Press, Jun. 2003, pp. 76-85.
Shapiro, "Embedded Image Coding Using Zerotrees of Wavelet Coefficients" IEEE Transactions on Signal Processing, vol. 41, No. 12, pp. 3445-3462, Dec. 1993.
Steffen et al., "Theory of Regular M-band Wavelets Bases" IEEE Transactions on Signal Processing, vol. 41. No. 12, pp. 3497-3511, Dec. 1993.
Teuhola, J. "A Compression Method for Clustered Bit-Vectors" Information Processing Letters, Amsterdam, NL, vol. 7, No. 6, pp. 308-311, Oct. 1978.
Tian et al., "Image Data Processing in the Compressed Wavelet Domain" Proceedings of ICSP'96, pp. 978-981, 1996.
Tredwell et al., "A Sequential Vector Selection Algorithm for Controllable Bandwidth Motion Description Encoding" IEEE Sympos. Intell. Multimedia. Video & Speech Process, May 2001.
Trott et al. "Wavelets Applied to Lossless Compression and Progressive Transmission of Floating Point Data in 3-D Curvilinear Grids" IEEE Proceedings of the Visualization Conference, Oct. 27, 1996, pp. 385-388.
Yuan et al., "Improved Matching Pursuits Image Coding" IEEE International Conference on Acoustics, Speech and Signal Processing ICASSP 2005, pp. II-201-II-204, Mar. 2005.
Yuan et al., "Low Complexity Separable Matching Pursuits" IEEE Int. Conference Acoustics Speech Signal Process, pp. III-725-III-728, May 2004.
Donald Monro, U.S. Appl. No. 11/677,515, filed Feb. 21, 2007, entitled "Hierarchical Update Scheme for Extremum Location with Indirect Addressing".
Donald Monro, U.S. Appl. No. 11/678,004, filed Feb. 22, 2007, entitled, "Video Coding With Motion Vectors Determined by Decoder".
Donald Monro, U.S. Appl. No. 11/678,479, filed Feb. 23, 2007, entitled, "Video Coding With Embedded Motion".

Donald Monro, U.S. Appl. No. 11/777,256, filed Jul. 11, 2007.
Donald Monro, U.S. Appl. No. 11/677,511, filed Feb. 21, 2007, entitled "Hierarchical Update Scheme for Extremum Location".
Donald Monro, U.S. Appl. No. 11/777,239, filed Jul. 12, 2007.
Donald Monro, U.S. Appl. No. 11/777,230, filed Jul. 12, 2007.
Donald Monro, U.S. Appl. No. 11/777,130, filed Jul. 12, 2007.
Donald Monro, U.S. Appl. No. 11/777,144, filed Jul. 12, 2007.
Donald Monro, U.S. Appl. No. 11/777,122, filed Jul. 12, 2007.
Donald Monro, U.S. Appl. No. 11/777,100, filed Jul. 12, 2007.
Donald Monro, U.S. Appl. No. 11/777,081, filed Jul. 12, 2007.
Donald Monro, U.S. Appl. No. 11/777,022, filed Jul. 12, 2007.
Donald Monro, U.S. Appl. No. 11/776,786, filed Jul. 12, 2007.
Donald Monro, PCT Serial No. PCT/US2007/008861, filed Apr. 9, 2007, entitled "Motion Assisted Data Enhancement".
Donald Monro, PCT Serial No. PCT/US2008/002100, filed Feb. 19, 2008, entitled "Hierarchical Update Scheme For Extremum Location".
Donald Monro, PCT Serial No. PCT/US2008/002101, filed Feb. 19, 2008, entitled "Hierarchical Update Scheme for Extremum Location with Indirect Addressing".
International Search Report for Appln. No. PCT/US2007/013100 issued Jan. 14, 2008, 4pgs.
International Search Report for Appln. No. PCT/US2007/000759 issued Feb. 14, 2008, 7pgs.
International Search Report for Appln. No. PCT/US2007/014138 issued Oct. 29, 2007, 2 pgs.
International Search Report for Appln. No. PCT/US2007/014182 issued Jan. 18, 2008, 1 pg.
International Search Report for Appln. No. PCT/US2007/014181 issued Jan. 14, 2008.
Non-Final Office Action for U.S. Appl. No. 11/255,090, completed Feb. 2, 2008, mailed Feb. 6, 2008, 14pgs.
Non-Final Office Action for U.S. Appl. No. 11/332,777, completed Dec. 12, 2007, mailed Dec. 21, 2007, 4pgs.
Final Office Action for U.S. Appl. No. 11/425,142, completed Sep. 10, 2007, mailed Sep. 18, 2007, 9 pgs.
Non-Final Office Action for U.S. Appl. No. 11/425,142, completed Mar. 7, 2007, mailed Mar. 20, 2007, 8 pgs.
Non-Final Office Action for U.S. Appl. No. 11/470,611, completed Aug. 29, 2007, mailed Sep. 5, 2007, 6 pgs.
Written Opinion for Appln. No. PCT/US2007/000759 completed Feb. 14, 2007, mailed Feb. 25, 2008, 11pgs.
International Search Report for Appln. No. PCT/US2007/019034 issued Apr. 8, 2008, 2pgs.
Written Opinion for Appln. No. PCT/US2007/019034 completed Mar. 31, 2008, mailed Apr. 8, 2008, 7pgs.
Non-Final Rejection for U.S. Appl. No. 11/470,611, mailed on Jun. 30, 2008, 5 pgs.
Non-Final Rejection for U.S. Appl. No. 11/422,316, mailed on Jul. 3, 2008, 7 pgs.
International Search Report and Written Opinion for Appln. No. PCT/US2007/008861, dated Oct. 13, 2009, 59 pgs.
International Search Report for Appln. PCT/US2007/066192, issued Oct. 13, 2009, 4 pgs.

* cited by examiner

MOTION ASSISTED DATA ENHANCEMENT

FIELD

This application pertains to the field of imaging, and more particularly, to the field of motion assisted enhancement of data, which may include images, video and/or audio data, other data, and/or combinations thereof.

BACKGROUND

Digital video and audio services such as transmitting digital images, video and/or audio information over wireless transmission networks, digital satellite services, streaming video and/or audio over the Internet, delivering video content to personal digital assistants or cellular phones, etc., are increasing in popularity. Interference may degrade the data and/or image in measurement, processing or transmission. Therefore, methods of correcting data and improving data quality may be becoming more important.

DESCRIPTION OF THE DRAWINGS

The claimed subject matter will be understood more fully from the detailed description given below and from the accompanying drawings of embodiments, which should not be taken to limit the claimed subject matter to the specific embodiments described, but are for explanation and understanding only.

Figure 1:
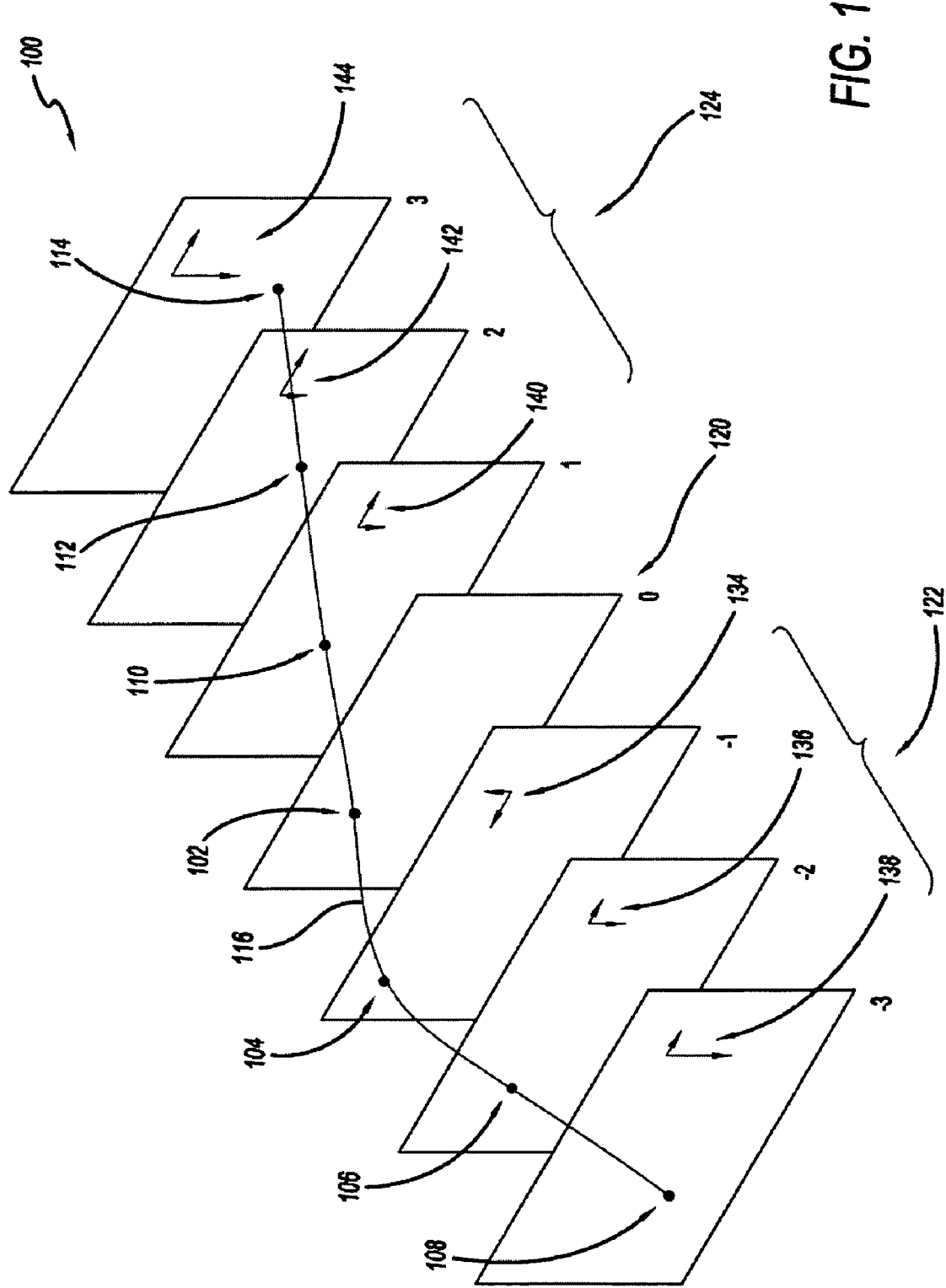
FIG. 1 is a diagram depicting an example enhancement of an image, according to an embodiment.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

An improved estimate of a noisy waveform represented by digitized data may be obtained by processing. This processing may include, but is not limited to, averaging of more than one data value, coherent averaging, and/or other processing, and/or combinations thereof. This processing may be utilized if the data occurs repeatedly, if the instances of the waveform can be aligned, and/or if the noise is additive. The noise power may typically be reduced by half by averaging two instances of the data, among other processing techniques.

Where the noise is not additive, other non-linear techniques may be utilized. These techniques may include, but are not limited to, removal of samples that may be outside of a range, and/or have values that may be inconsistent with the other values being used.

A video sequence may include a series of frames of the same scene. Objects within that scene may change relatively slowly from frame to frame. If the data contains noise, but the objects are relatively static from frame to frame, a better estimate of the data may be obtained by averaging and/or other processing of the data values over a number of frames. Noise may be added via environmental conditions, as well as by the recording, editing, processing data transmission, and/or receiving equipment. Therefore, estimating the value of the data may be accomplished by processing multiple instances of a particular data value, from multiple frames.

In a sequence of frames, objects may tend to move within the scene. A particular pixel or group of pixels may be followed from frame to frame. Motion estimation techniques may be utilized to trace the pixel or group of pixels from frame to frame. A trace, which may include a list of pixel values, may be constructed based at least in part upon the motion estimation of the pixel or group of pixels from frame to frame. This trace of values may be processed to create an estimation of data values within a frame and/or frames.

Objects may be represented by groups of pixel in a video sequence. In some systems, irregularly shaped groups may be formed into video objects whose motion may be described by a single vector. Another type of motion estimation may be optical flow, which may describe the motion of every pixel in an image by either a discrete vector for each pixel, and/or by a mathematical description of the motion. Other techniques may be utilized to achieve smoothness of the objects from frame to frame. Combinations of all of these techniques may be utilized to enhance the data.

A pixel or group of pixels may be identified in a frame of interest, or target frame. The position of the pixel or group of pixels may then be identified in the frames adjacent to the target frame. The values of the pixel or group of pixels may then be processed to estimate the value of the pixel or group of pixels in the target frame, as well as other frames. Pixels adjacent to the pixel or group of pixels may also be utilized to enhance the data. The processing may be combinations of the above-described process to enhance the data. If the motion is at the sub-pixel level, the trace may be constructed by interpolating from adjacent pixels.

One consideration may be the number of frames to be utilized. Better noise reduction may be achieved with the use of more data. However, if the pixel or group of pixels drift into other objects, and/or a sudden change of illumination occurs, the trace may be terminated because the values may not be representative of the data to be enhanced. Therefore, it may be advantageous to examine the data before, during, and/or after the trace is constructed in the estimation process to further enhance the data.

Furthermore, once a trace has been constructed, a determination may be made to use, or not to use certain values. The values may be excluded if they fall outside a range. The range may be predetermined and/or determined after the values are present in the trace. A histogram of values may be constructed to better analyze the data. If the data in the histogram had one peak, and/or was reasonably symmetric, then it may be relatively likely that either a mean or median of the histogram may be a relatively attractive estimate of the pixel or group of pixels value. This estimation may further depend on whether the noise is purely additive, and to what degree obscuritive noise is present.

When evaluating the trace and/or histogram, some values may be far from the mean and/or median. These values may be excluded as obscuritive. This may occur as a result of a few bright values, such as "shot noise" and may adversely affect the estimation of the data. It may also be possible that too many frames may have been utilized in creating the trace and/or histogram or by processing of the trace to detect a trend. This may be determined by examining the standard deviation of the trace and/or histogram. A different length of trace may occur for different pixels or group of pixels within the same image. For this reason, traces may be saved for use by other traces to better estimate the data.

This process may be utilized for an entire video sequence, or for a portion of a video sequence. Furthermore, traces may be utilized to enhance data from more than one frame. Because spatial and/or temporal consistencies may exist in frames of video, constructing a trace may include linear and/or nonlinear spatial filtering, may be used in the trace and/or may be applied after the trace is constructed. Furthermore, the above-described techniques may be utilized with other methods of video enhancement to further enhance the data.

FIG. 1 is a diagram of one embodiment of a sequence of frames used for motion assisted data enhancement, at 100. In an embodiment, frames 100 may be consecutive frames of a motion image. An embodiment may include a target frame 120, as well as frames in a positive 124, and negative 122 directions, with relation to target frame 120. The positive and negative directions may indicate a frame in time, however, the scope of this disclosure is not limited in this respect. Target frame 120 may include a data point and/or pixel 102. In the embodiment of motion image, data point and/or pixel 102 may be followed and/or traced between the target frame 120 and one or more adjacent frames, 122, 124. The data point and/or pixel position in adjacent frames 122 may correspond to pixels at positions 104, 106 and 108, respectively. Similarly, data point and/or pixel positions 110, 112, and 114 may correspond to adjacent frames 124.

A trace 116 may be created from the pixel positions in adjacent frames of a data point and/or pixel 102. The trace may utilize vectors, such as at 140, 142, and 144, at least in part, to determine data point and/or pixel locations 110, 112, and 114, respectively. However, many other methods and systems may be utilized to create trace 116, and the scope of this disclosure is not limited in this respect. Similarly, vectors 134, 136, and 138 may be utilized, at least in part, to form another portion of trace 116.

The particular image values may be obtained from the data point and/or pixels at the locations, once the locations are known. The image values may indicate color, intensity, and/or many other properties, and/or combinations thereof. These values may be utilized to estimate a value at data point and/or pixel 102 that may be closer to the original value and/or intended value. The value at data point and/or pixel 102 may have been distorted by noise, interference in the transmission, and/or created by devices handling the data. Seven frames have been shown here to better understand the subject matter. However, the scope of the claimed subject matter is not limited in this respect.

Figure 2:
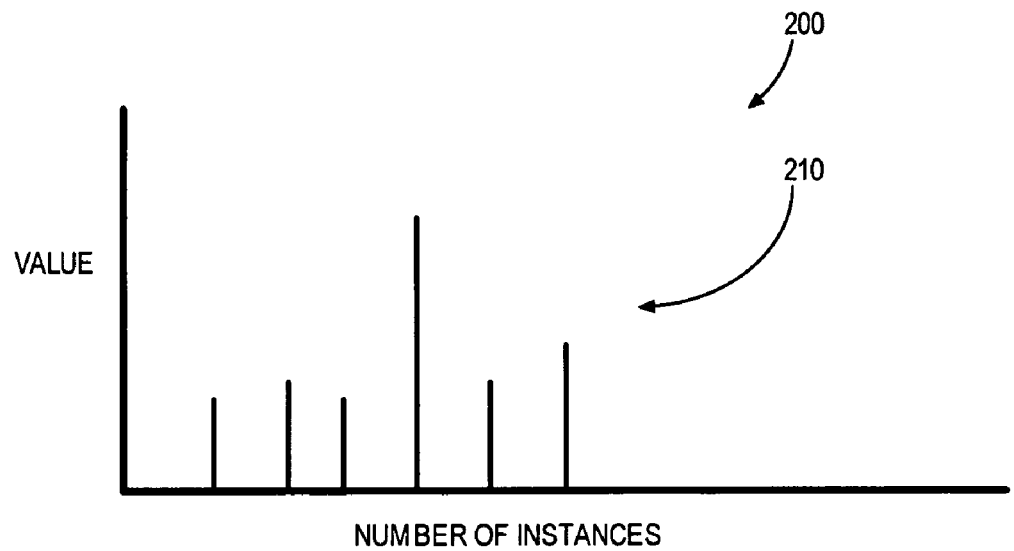
FIG. 2 is a diagram depicting pixel values within adjacent frames, according to an embodiment.

These values may be utilized to form a histogram 200, as shown in FIG. 2. FIG. 2 may be an embodiment of a graph and/or histogram of values 210 from pixel 102 from the target frame 120 and one or more adjacent frames. The values may be used to estimate a value at data point and/or pixel 102. In an embodiment, the values may be averaged, filtered, a median, mode, and/or means may be found. Combinations of these different calculations may be utilized to better determine the original and/or intended value of data point and/or pixel 102. It will be understood that many different calculations and/or processing of these values may be accomplished without straying from the concepts disclosed here, and this disclosure is not limited in this respect.

Figure 3:
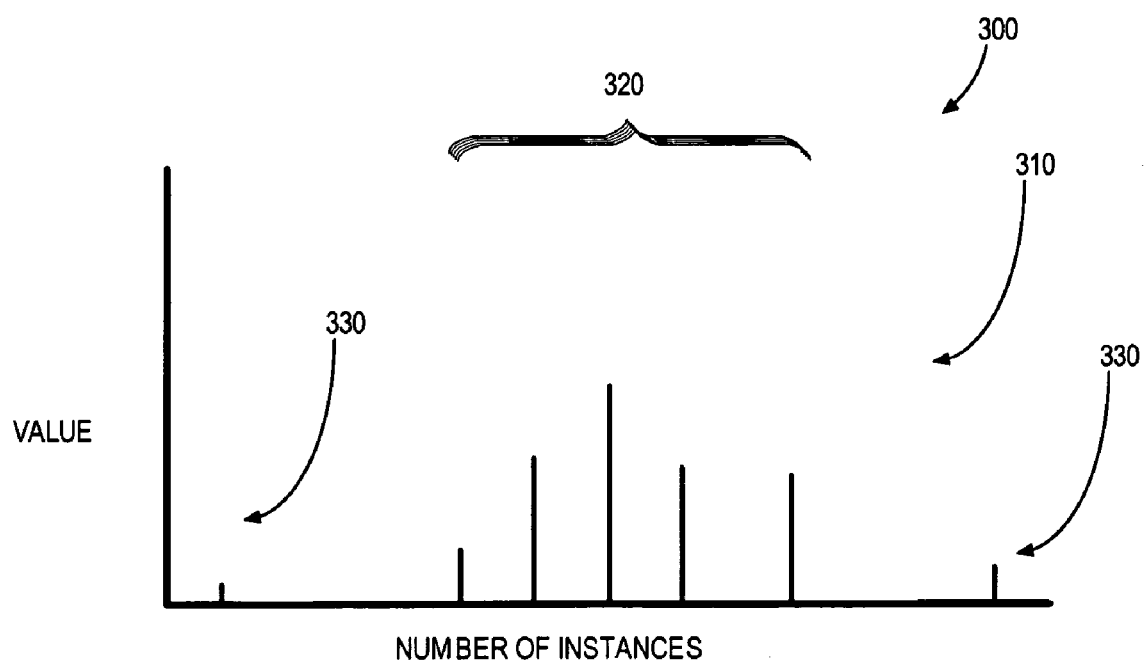
FIG. 3 is a diagram depicting a histogram of pixel values, according to an embodiment.

FIG. 3 may show a histogram 300, according to an embodiment. Histogram 300 may include values 310. Histogram 300 may also include a determined range 320. Values within the determined range 320 may be utilized in calculation for an estimation of the value at the data point. Histogram 300 may also include values 330 outside of determined range 320. These values may not be utilized in calculation of the estimation of the values at a data point. The use of many values to estimate a value for a pixel may allow the non-use of pixel values, which are abhorrent, or corrupted. In this manner, a better estimation of a pixel value may be obtained.

Determined range 320 may be predetermined by a user and/or application program, in an embodiment, but may be predetermined in many other ways. Furthermore, the range may be determined upon the values collected for the trace. In an embodiment, values within a determined range from a mean, median, and/or mode, and/or combinations thereof may be utilized. However, it will be appreciated that many other methods and systems for determining determined range 320 may be utilized without straying from the spirit and scope of this disclosure. The data in the histogram may be filtered to filter out noise or corrupted data. Furthermore, filtering may occur before the data is placed into the histogram.

Figure 4:
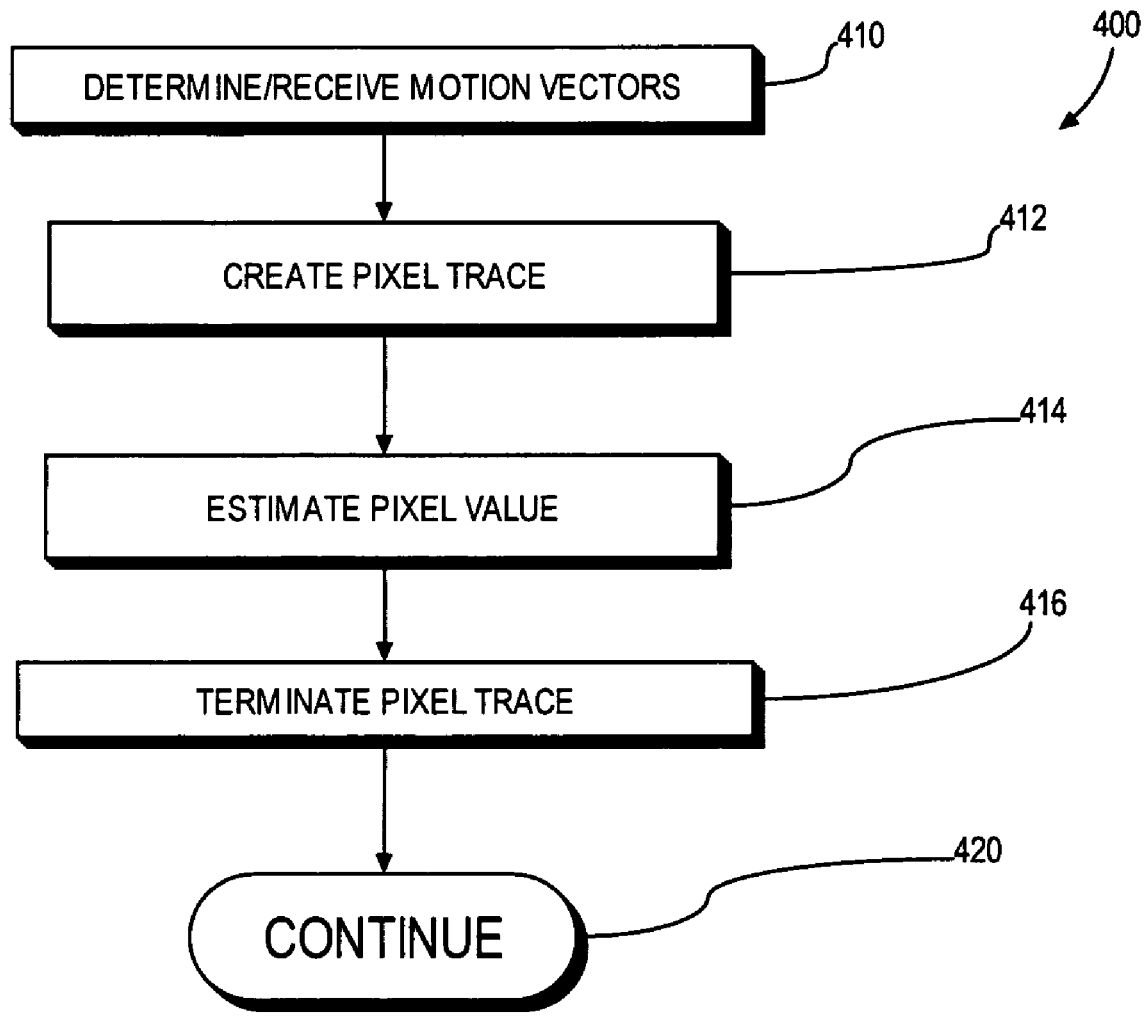
FIG. 4 is a flow diagram of one embodiment of a method for enhancing data, according to an embodiment.

FIG. 4 is a flow diagram illustrating a method according to an embodiment, at 400. Method 400 may include determining and/or receiving vectors at 410. Vectors may be determined in many ways including, but not limited to, optical flow and/or block matching, and/or combinations thereof. Furthermore, vectors may be precalculated, or the vectors may be received and utilized.

Method 400 may further include creating a trace 412. Once the position of a pixel in adjacent frames is determined, one or more pixel values may be utilized to form a trace. The trace may be created using pixel values from adjacent frames, as well as other frames, as desired. The trace may be utilized to create a histogram, upon which many calculations may be performed to estimate a pixel value at 414.

Estimating a pixel value 414 may include creating a histogram and performing many different calculations upon the values in the histogram. Estimating may also include excluding values from utilization from use in the calculation. The estimation may be based at least in part upon, but not limited to, the average, the median, the mode, the mean, and/or combinations thereof. Furthermore, the estimation may take into account other pixel traces, and may be utilized for more than one pixel in more than one frame and/or trace.

The pixel trace may be terminated at 416. The determination to terminate the trace may be based upon a certain number of frames utilized, as well as the values found within a frame. If the values within the frame are found to be outside a range, the values may not be suitable for use and the trace may be terminated. It will be appreciated that many other events and/or determinations may be utilized to terminate the trace. The method then continues at 420.

Figure 5:
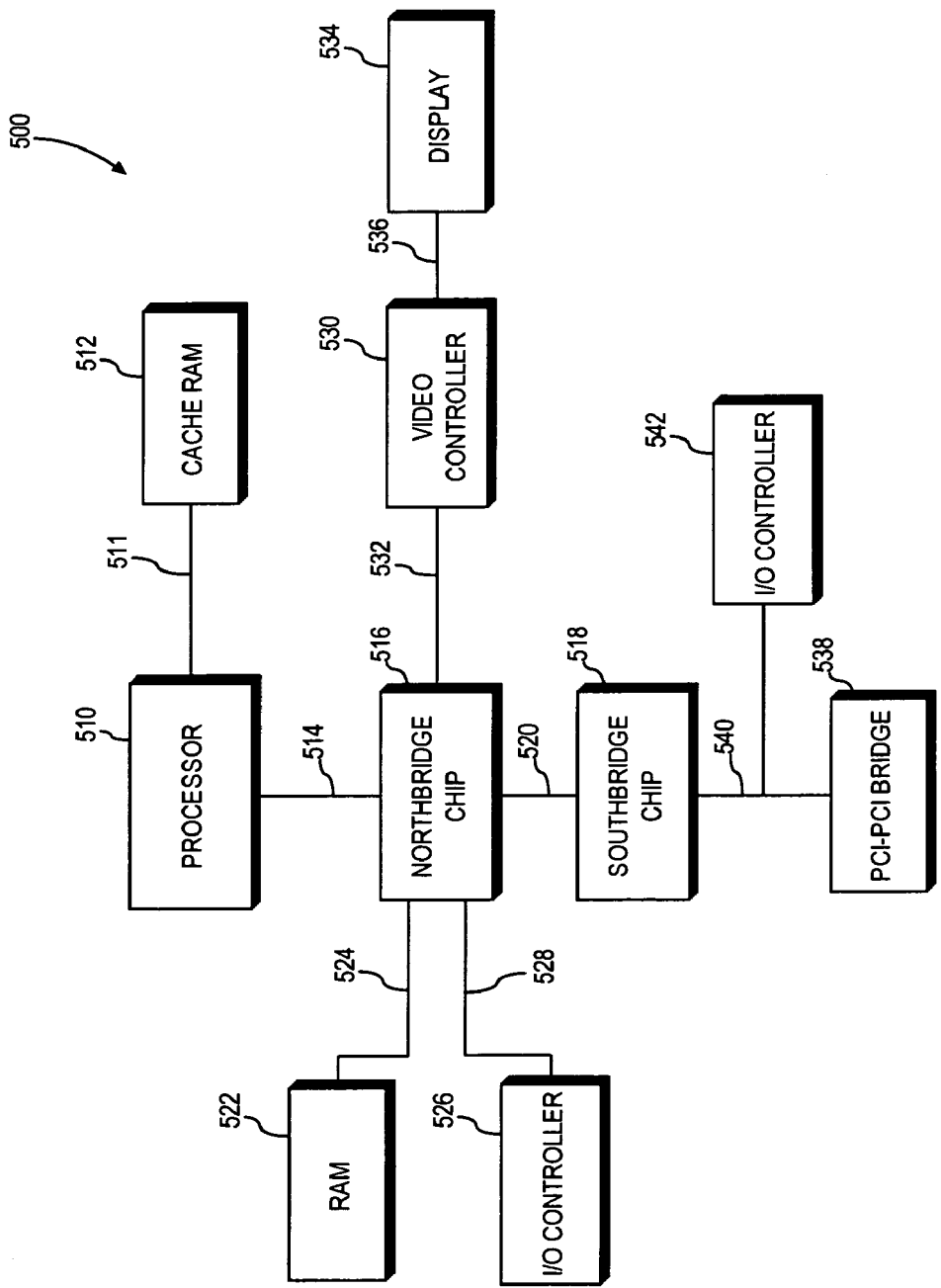
FIG. 5 is a block diagram of a computing platform capable of enhancing data in accordance with one or more embodiments.

Referring now to FIG. 5, a block diagram of a computing platform capable of enhancing data in accordance with one or more embodiments will be discussed. It should be noted that computing platform 500 of FIG. 5 is merely one type of computing platform, and other computing platforms having more and/or fewer and/or different components than shown in FIG. 5 may be implemented, and the scope of claimed subject matter is not limited in this respect. In one or more embodiments, computing platform 500 may be utilized to implement process 400 in whole and/or using more and/or fewer blocks than shown in FIG. 4, and the scope of claimed subject matter is not limited in this respect. Computing platform 500 may include processor 510 coupled to cache random access memory (RAM) 512 via back side bus 511. Processor 510 may also couple to a chipset that includes Northbridge chip 516 via front side bus 514, and also to Southbridge chip 518 via bus 520. In one embodiment, Northbridge chip 516 in general may be utilized to connect a processor to memory, to an input/output bus, to a video bus, and to Level 2 cache, although the scope of claimed subject matter is not limited in this respect.

In one embodiment, Southbridge chip 518 may be utilized to control input/output functions, the basic input/out system (BIOS), and interrupt control functions of Integrated Drive Electronics (IDE) devices, such as hard disks or compact disk read-only memory (CD-ROM) devices or the like, although the scope of claimed subject matter is not limited in this respect. Random access memory (RAM) 522 may couple to Northbridge chip 516 via main memory bus 524, and input/output (I/O) controller 526 may also couple to Northbridge chip 516 via I/O bus 528. In one embodiment, I/O controller 526 and I/O bus 528 may be in compliance with a Small Computer Systems Interface (SCSI) specification such as the American National Standards Institute (ANSI) X3.131-1994 SCSI-2 specification, although the scope of claimed subject matter is not limited in this respect. In an alternative embodiment, I/O controller 526 and I/O bus 528 may be in compliance with a Peripheral Component Interconnect (PCI) bus, although the scope of claimed subject matter is not limited in this respect.

Video controller 530 may couple to Northbridge chip 516 via video bus 532, which in one embodiment may comprise an Accelerated Graphics Port (AGP) bus, although the scope of claimed subject matter is not limited in this respect. Video controller 530 may provide video signals to an optionally coupled display 534 via display interface 536, which in one embodiment may comprise a Digital Visual Interface (DVI) in compliance with a standard promulgated by the Digital Display Working Group, although the scope of claimed subject matter is not limited in this respect. Southbridge chip 518 may couple to a peripheral component interconnect to peripheral component interconnect (PCI-PCI) bridge 538 via input/output bus 540, which may in turn couple to I/O controller 542 to control various peripheral devices such as Universal Serial Bus (USB) devices, or devices compatible with an Institute of Electrical and Electronics Engineers (IEEE) 1394 specification, although the scope of claimed subject matter is not limited in this respect.

For example, some portions of the detailed description are presented in terms of processes, programs and/or symbolic representations of operations on data bits and/or binary digital signals within a computer memory. These processes, descriptions and/or representations may include techniques used in the data processing arts to convey the arrangement of a computer system and/or other information handling system to operate according to such programs, processes, and/or symbolic representations of operations.

A process may be generally considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It may be convenient at times, principally for reasons of common usage, to refer to these signals as bits, values, elements, symbols, characters, terms, numbers and/or the like. However, these and/or similar terms may be associated with the appropriate physical quantities, and are merely convenient labels applied to these quantities.

Unless specifically stated otherwise, as apparent from the following discussions, throughout the specification discussion utilizing terms such as processing, computing, calculating, determining, and/or the like, refer to the action and/or processes of a computing platform such as computer and/or computing system, and/or similar electronic computing device, that manipulate and/or transform data represented as physical, such as electronic, quantities within the registers and/or memories of the computer and/or computing system and/or similar electronic and/or computing device into other data similarly represented as physical quantities within the memories, registers and/or other such information storage, transmission and/or display devices of the computing system and/or other information handling system.

Embodiments claimed may include one or more apparatuses for performing the operations herein. Such an apparatus may be specially constructed for the desired purposes, or it may comprise a general purpose computing device selectively activated and/or reconfigured by a program stored in the device. Such a program may be stored on a storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and/or programmable read only memories (EEPROMs), flash memory, magnetic and/or optical cards, and/or any other type of media suitable for storing electronic instructions, and/or capable of being coupled to a system bus for a computing device, computing platform, and/or other information handling system. However, the computer program product may also be capable of being downloaded directly to the computing device, such as, but not limited to, a download over the Internet and/or other network and/or communication. This disclosure is intended to encompass a carrier wave format.

The processes and/or displays presented herein are not necessarily limited to any particular computing device and/or other apparatus. Various general purpose systems may be used with programs in accordance with the teachings herein, or a more specialized apparatus may be constructed to perform the desired method. The desired structure for a variety of these systems will appear from the description below. In addition, embodiments are not described with reference to any particular programming language. It will be appreciated that a variety of programming languages may be used to implement the teachings described herein.

In the description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments.

In the foregoing specification, claimed subject matter has been described with reference to specific example embodiments thereof. It will, however, be evident that various modifications and/or changes may be made thereto without departing from the broader spirit and/or scope of the subject matter as set forth in the appended claims. The specification and/or drawings are, accordingly, to be regarded in an illustrative rather than in a restrictive, sense.

What is claimed is:

1. A method, comprising:
    identifying, by a processor, a first point for target data in a target frame;
    identifying, by the processor, a second point for the target data by identifying one or more points for the target data in one or more frames adjacent to the target frame;
    determining, by the processor, a value of a respective one of the one or more points within a respective one of the one or more adjacent frames;
    determining, by the processor, a trace based on the first and second points; and
    determining, by the processor, at least an approximate value of the target data from the trace.

2. The method of claim 1, wherein the determining at least an approximate value of the target data from the trace further comprises:
    generating a histogram of values of the second point from the trace; and
    determining the approximate value of the target data by:
        determining an average, a mean, a median, or a mode of the values of the second point;
        determining a combination of two or more of an average, a mean, a median, or a mode of the values of the second point; or
        filtering the values of the second point.

3. The method of claim 1, wherein the determining at least an approximate value of the target data from the trace comprises:
    discarding values for the approximate value outside of a specified range.

4. The method of claim 3, wherein the determining at least an approximate value of the target data from the trace further comprises:
    using user-defined values to determine the range.

5. The method of claim 3, wherein the determining at least an approximate value of the target data from the trace further comprises:
    using values determined from the trace to determine the range.

6. The method of claim 3, wherein the determining at least an approximate value of the target data from the trace further comprises:
    using a mean, a median, or a mode or a combination of two or more of a mean, median, or mode of the trace to determine the range.

7. The method of claim 1, further comprising:
    using one or more of image data, video data, audio data, digital image data, other data, or combinations thereof, as data forming at least one of the target frame and the adjacent frame.

8. The method of claim 1, wherein:
    the determining a trace from the first and second points is performed more than one time to determine more than one of the trace; and
    the determining at least an approximate value of the target data from the trace comprises using the more than one of the trace.

9. The method of claim 1, wherein the determining at least an approximate value of the target data from the trace comprises:
    using at least one stored trace as the trace to determine the approximate value of the target data.

10. The method of claim 1, wherein the identifying the second point for the target data in the frame adjacent to the target frame comprises:
    determining motion vectors for the first and second points.

11. The method of claim 10, further comprising:
    using block matching of the adjacent frame to perform the determining of the motion vectors.

12. The method of claim 10, further comprising:
    using an optical flow to perform the determining of the motion vectors.

13. The method of claim 10, further comprising:
    using pre-calculated motion vectors to perform the determining of the motion vectors.

14. The method of claim 10, further comprising:
    using received motion vectors to perform the determining of the motion vectors.

15. The method of claim 1, wherein the determining at least an approximate value of the target data from the trace comprises:
    filtering values of the second point.

16. The method of claim 1, further comprising:
    using image color or image intensity as the value of the target data.

17. The method of claim 1, further comprising:
    using a pixel as the target data.

18. The method of claim 1, further comprising:
    terminating the trace based on a certain number of frames.

19. The method of claim 1, further comprising:
    determining a range comprised of values of the one or more points;
    determining, by the processor, whether the range includes the value of the respective one of the points; and
    terminating the trace at the respective one of the adjacent frames in response to determining that the range does not include the value of the respective one of the points.

20. The method of claim 1, further comprising:
    storing the trace.

21. A tangible computer-readable medium having instructions stored thereon, the instructions comprising:
    instructions to identify a first point for the target data in a target frame;
    instructions to identify a second point for the target data in a frame adjacent to the target frame by identifying one or more points for the target data in one or more frames adjacent to the target frame;
    instructions to determine a value of a respective one of the one or more points within a respective one of the one or more adjacent frames;
    instructions to determine a trace based on the first and second points; and
    instructions to determine at least an approximate value of the target data from the trace.

22. An article of manufacture comprising a computer-readable medium having computer-executable instructions stored thereon, that, if executed by a computing device, cause the computing device to perform operations comprising:

identifying a first point for target data in a target frame;

identifying a second point for the target data in a frame adjacent to the target frame by identifying one or more points for the target data in one or more frames adjacent to the target frame;

determining a value of a respective one of the one or more points within a respective one of the one or more adjacent frames;

determining a trace based on the first and second points; and determining at least an approximate value of the target data from the trace.

23. The method of claim 1, wherein the trace includes values of the target data at the first and second points.

24. A system, comprising:

means for identifying a first point for target data in a target frame;

means for identifying a second point for the target data in a frame adjacent to the target frame comprising means for identifying one or more points for the target data in one or more frames adjacent to the target frame;

means for determining a value of a respective one of the one or more points within a respective one of the one or more adjacent frames;

means for determining a trace based on the first and second points; and means for determining at least an approximate value of the target data from the trace means for determining at least an approximate value of the target data from the trace.

* * * * *